United States Patent
Liu

(10) Patent No.: US 11,879,601 B2
(45) Date of Patent: Jan. 23, 2024

(54) LIGHT SOURCE MODULE

(71) Applicant: DELTA ELECTRONICS, INC., Taoyuan (TW)

(72) Inventor: Kai-Ming Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/577,019

(22) Filed: Jan. 17, 2022

(65) Prior Publication Data

US 2023/0127249 A1    Apr. 27, 2023

(30) Foreign Application Priority Data

Oct. 21, 2021   (CN) .......................... 202111224864.8

(51) Int. Cl.
| | |
|---|---|
| F21K 9/64 | (2016.01) |
| F21V 7/22 | (2018.01) |
| F21V 5/04 | (2006.01) |
| F21V 9/45 | (2018.01) |
| G03B 21/20 | (2006.01) |

(52) U.S. Cl.
CPC .................. *F21K 9/64* (2016.08); *F21V 5/04* (2013.01); *F21V 7/22* (2013.01); *F21V 9/45* (2018.02); *G03B 21/204* (2013.01)

(58) Field of Classification Search
CPC ..... F21V 9/45; F21V 5/04; F21V 7/22; F21K 9/64; G03B 21/204
See application file for complete search history.

(56) References Cited

U.S. PATENT DOCUMENTS

| | | | | |
|---|---|---|---|---|
| 9,004,701 | B2* | 4/2015 | Berben | H04N 9/3161 |
| | | | | 353/38 |
| 9,411,218 | B2* | 8/2016 | Hsieh | G02B 26/008 |
| 9,581,887 | B2* | 2/2017 | Tajiri | G03B 21/28 |
| 9,927,685 | B2* | 3/2018 | Liao | G03B 21/204 |
| 10,146,115 | B2* | 12/2018 | Mori | F21V 9/30 |
| 10,948,811 | B2 | 3/2021 | Pan et al. | |

(Continued)

FOREIGN PATENT DOCUMENTS

| | | |
|---|---|---|
| CN | 106125475 A | 11/2016 |
| TW | 201945823 A | 12/2019 |

OTHER PUBLICATIONS

The pertinent parts of TW201945823A.
The pertinent parts of CN106125475A.

*Primary Examiner* — Arman B Fallahkhair
(74) *Attorney, Agent, or Firm* — CKC & Partners Co., LLC

(57) ABSTRACT

A light source module includes a first light-emitting unit, a second light-emitting unit, a first dichroic mirror, and a wavelength conversion unit. The first light-emitting unit emits a first color light. The second light-emitting unit emits a second color light. The first dichroic mirror allows the first color light to transmit through and has a passing area. The passing area allows the second color light to pass through. The wavelength conversion unit includes a substrate and a phosphor layer disposed on the substrate. The phosphor layer converts the first color light transmitting through the first dichroic mirror into a third color light, and reflects and scatters the second color light passing through the passing area. The first dichroic mirror reflects the second color light reflected by the wavelength conversion unit and the third color light.

16 Claims, 5 Drawing Sheets

(56) References Cited

U.S. PATENT DOCUMENTS

| | | | |
|---|---|---|---|
| 10,969,672 B2* | 4/2021 | Maeda | H04N 9/3105 |
| 11,378,876 B2* | 7/2022 | Guo | G02B 26/008 |
| 2013/0038847 A1* | 2/2013 | Katou | H04N 9/3161 |
| | | | 353/98 |
| 2016/0291315 A1* | 10/2016 | Hsu | G03B 21/204 |
| 2016/0327851 A1 | 11/2016 | Liao et al. | |

* cited by examiner

LIGHT SOURCE MODULE

CROSS-REFERENCE TO RELATED APPLICATION

This application claims priority to China Application Serial Number 202111224864.8, filed Oct. 21, 2021, which is herein incorporated by reference in its entirety.

BACKGROUND

Field of Invention

The present disclosure relates to a light source module, and more particularly, to a light source module related to laser phosphor wheel projection.

Description of Related Art

In a conventional laser phosphor wheel projector, an additional laser light source is often used to emit a colored light to fill the light (for example, red laser light is used to supplement the red light) to increase the proportion and saturation of the color light. An existing laser phosphor wheel projector generates red light, yellow light, and blue light by installing a dichroic mirror and a phosphor wheel.

However, when long-wavelength color light passes through the dichroic mirror, the energy of the long-wavelength color light will be reduced, resulting in insufficient proportion and saturation of the final projected color light.

Therefore, how to propose a light source module that can solve the aforementioned problems is one of the problems that the industry urgently wants to invest in research and development resources to solve.

SUMMARY

In view of this, one purpose of present disclosure is to provide a light source module that can solve the aforementioned problems.

In order to achieve the above objective, according to one embodiment of the present disclosure, a light source module includes a first light-emitting unit, a second light-emitting unit, a dichroic mirror, and a wavelength conversion unit. The first light-emitting unit is configured to emit a first color light. The second light-emitting unit is configured to emit a second color light. The first dichroic mirror is configured to allow the first color light to transmit through and has a passing area. The passing area is configured to allow the second color light to pass through. The wavelength conversion unit includes a substrate and a phosphor layer disposed on the substrate. The phosphor layer is configured to convert the first color light transmitting through the first dichroic mirror into a third color light, and is configured to reflect and scatter the second color light passing through the passing area. The first dichroic mirror is configured to reflect the second color light reflected by the wavelength conversion unit and the third color light.

In one or more embodiments of the present disclosure, the pass area is an opening.

In one or more embodiments of the present disclosure, the phosphor layer is further configured to reflect and scatter the second color light.

In one or more embodiments of the present disclosure, the substrate is a reflective substrate and does not include a transmissive substrate.

In one or more embodiments of the present disclosure, the substrate has a transmissive portion, and the transmissive portion is configured to allow the first color light to pass through.

In one or more embodiments of the present disclosure, the transmissive portion is a transmissive material or a hollowed portion.

In one or more embodiments of the present disclosure, the light source module further includes a second dichroic mirror. The second dichroic mirror is configured to reflect the second color light and allow the first color light to pass through, and enable the first color light and the second color light to reach a relay lens.

In one or more embodiments of the present disclosure, the relay lens is disposed between the second light-emitting unit and the first dichroic mirror, and is configured to transmit the first color light and the second color light to reach the first dichroic mirror.

In one or more embodiments of the present disclosure, the relay lens is further configured to transmit the second color light to pass through the passing area.

In one or more embodiments of the present disclosure, the light source module further includes a second dichroic mirror. The second dichroic mirror is configured to reflect the first color light and allow the second color light to pass through, and enable the first color light and the second color light to reach a relay lens.

In one or more embodiments of the present disclosure, the relay lens is disposed between the second light-emitting unit and the first dichroic mirror, and is configured to propagate the first color light and the second color light to reach the first dichroic mirror.

In one or more embodiments of the present disclosure, the relay lens is further configured to propagate the second color light to pass through the passing area.

In one or more embodiments of the present disclosure, a peak wavelength of the third color light is greater than a peak wavelength of the first color light and is less than a peak wavelength of the second color light.

In one or more embodiments of the present disclosure, a wavelength range of the second color light and a wavelength range of the third color light at least partially overlap.

In one or more embodiments of the present disclosure, a wavelength range of the second color light is larger than a wavelength range of the third color light.

In one or more embodiments of the present disclosure, the first color light is a blue light, and the second color light is a red light.

In one or more embodiments of the present disclosure, the third color light is substantially a yellow light.

In summary, in the light source module of the present disclosure, by arranging the passing area on the first dichroic mirror, the color light used as a supplementary light can pass through the first dichroic mirror via the passing area. The color light passing through the passing area is then reflected and scattered by the phosphor layer of the wavelength conversion unit, and is collected by the integration rod. It can be seen that there is no excessive loss of the color light during the process from being emitted to reaching the integration rod, so as to achieve the best light supplement effect.

The above-mentioned description is only used to explain the problem to be solved by the present disclosure, the technical means to solve the problem, and the effects produced, etc. The specific details of the present disclosure will be well discussed in the following embodiments and related drawings.

BRIEF DESCRIPTION OF THE DRAWINGS

In order to make the above and other objectives, features, advantages and examples of the present disclosure more obvious, the description of the accompanying drawings is as follows.

DETAILED DESCRIPTION

Figure 1:
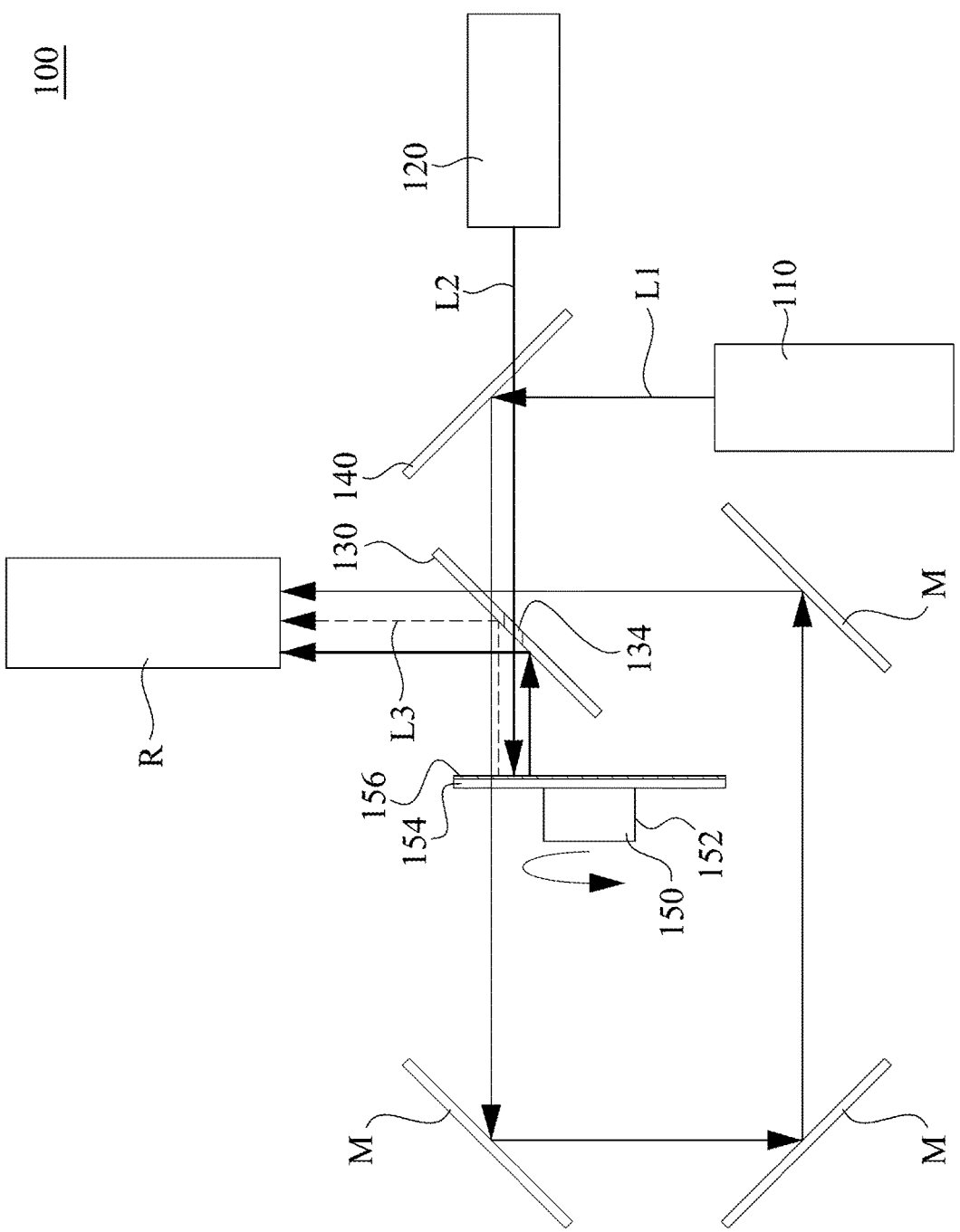
FIG. 1 shows a schematic view of a light source module in accordance with an embodiment of present disclosure.

Hereinafter, a plurality of embodiments of the present disclosure will be disclosed in diagrams. For clarity of discussion, many details in practice will be described in the following description. However, it should be understood that these details in practice should not limit present disclosure. In other words, in some embodiments of present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the light source module 100 according to one or more embodiments of the present disclosure will be described in detail.

Reference is made to FIG. 1 which shows a structural configuration of a light source module 100 according to an embodiment of the present disclosure. The light source module 100 includes a first light-emitting unit 110, a second light-emitting unit 120, a first dichroic mirror 130, a second dichroic mirror 140, a wavelength conversion unit 150, a plurality of reflecting mirrors M, and an integration rod R. The first light-emitting unit 110 is configured to emit first color light L1. The second light-emitting unit 120 is configured to emit second color light L2. The first dichroic mirror 130 is configured to allow the first color light L1 to transmit through and has a passing area 134. The passing area 134 is configured to allow the second color light L2 to pass through. The first dichroic mirror 130 is also configured to reflect the second color light L2 reflected by the wavelength conversion unit 150 and the third color light L3. The second dichroic mirror 140 is configured to allow the second color light L2 to pass through, and is also configured to reflect the first color light L1. The wavelength conversion unit 150 is substantially a high-speed rotating phosphor wheel configured to convert the first color light L1 transmitting through the first dichroic mirror 130 into a third color light L3, and configured to reflect the second color light L2. The mirror M is configured to reflect the first color light L1. The integration rod R is configured to receive the first color light L1, and is also configured to receive the second color light L2 and the third color light L3 reflected and scattered by the wavelength conversion unit 150.

Figure 2:
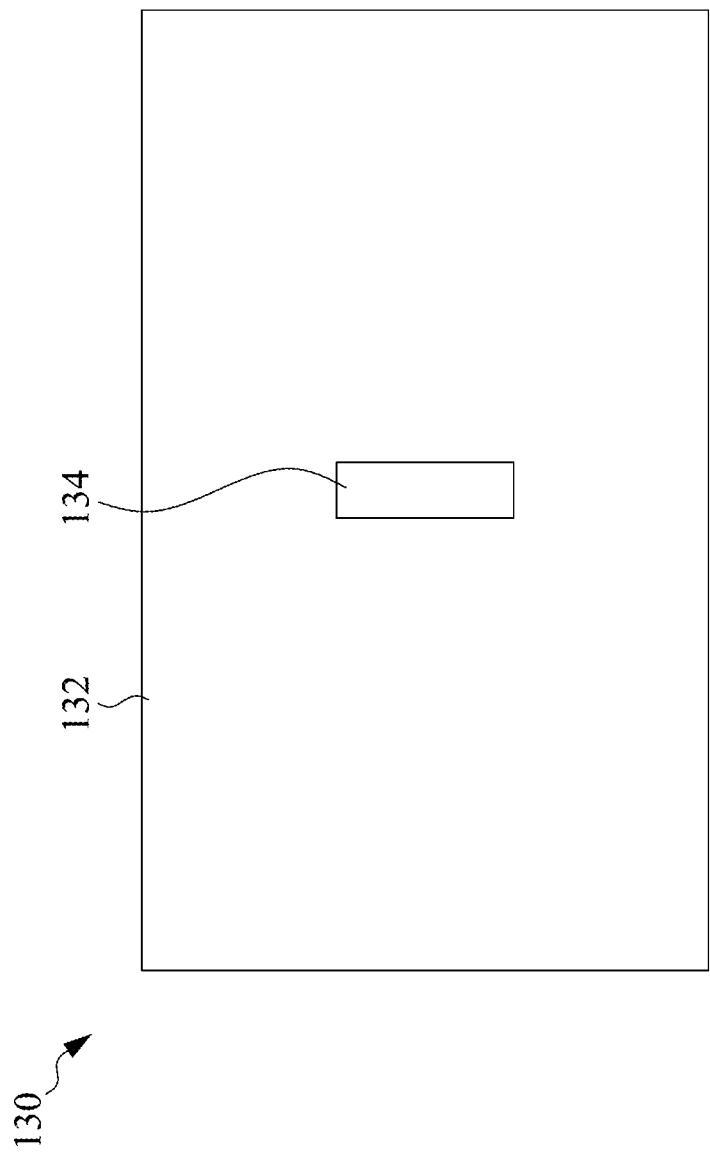
FIG. 2 shows another schematic view of a dichroic mirror in accordance with an embodiment of present disclosure.

Reference is made to FIG. 2 which shows the structure of the first dichroic mirror 130 according to an embodiment of the present disclosure. The first dichroic mirror 130 has a coating area 132 and a passing area 134. The coating area 132 surrounds the passing area 134. In some embodiments, the passing area 134 is an opening that can allow any light to pass through.

Figure 3:
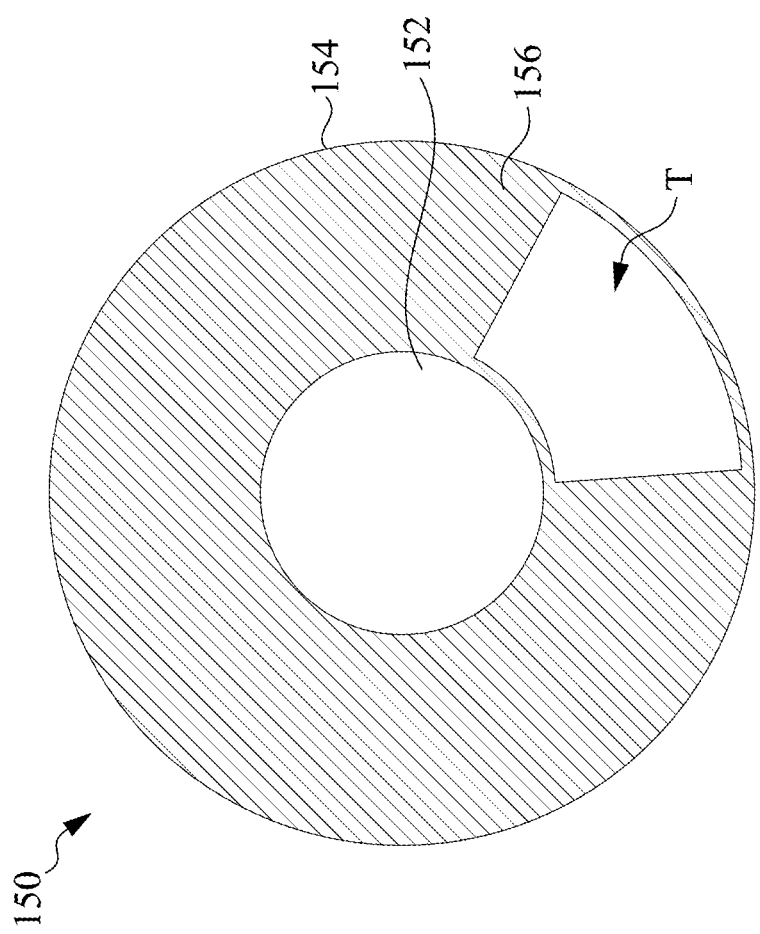
FIG. 3 shows a cross-sectional view of a wavelength conversion unit in accordance with an embodiment of present disclosure.

Reference is made to FIG. 3 which shows the structure of the wavelength conversion unit 150 according to an embodiment of the present disclosure. The wavelength conversion unit 150 includes a rotating shaft 152, a substrate 154, and a phosphor layer 156. The rotating shaft 152 is configured to be driven by a motor so that the wavelength conversion unit 150 rotates based on the rotating shaft 152. The substrate 154 is disposed on the rotating shaft 152 and surrounds the rotating shaft 152. The substrate 154 has a transmissive portion T. The transmissive portion T is, for example, a transmissive material (for example, glass) or a hollowed portion, and the area or number of the transmissive portion T depends on requirements. For example, when incidence angle of second color light L2 is not perpendicular to the substrate 154, light loss in strength of the second color light L2 would be reduced if transmissive portion T is the hollowed portion. A base of the phosphor layer 156 is a reflective substrate, such as a glass substrate coated with a dichroic film layer, or a metal reflective substrate, which allows the phosphor layer 156 to be excited and emit light in a reflective manner in the direction of the excitation light source. In some embodiments, the light source module 100 is a laser light module in a single-chip digital light processing (DLP) system. The phosphor layer 156 is disposed on the substrate 154 and partially surrounds the rotating shaft 152. Specifically, the substrate 154 is configured to transmit the first color light L1. The phosphor layer 156 is configured to convert the first color light L1 into the third color light L3, and is configured to reflect and scatter the second color light L2. It should also be noted that the phosphor layer 156 includes wavelength-converting particles, such as yttrium aluminum garnet (YAG) powder, which can convert the light into longer wavelength excited light (for example, green light or yellow light) under the irradiation of shorter wavelength light (for example, blue or ultra-violet (UV) light), but the above-mentioned excited light will not be generated under longer-wavelength irradiation. In this way, the function of the wavelength-converting particles is equivalent to scattering particles. Therefore, the phosphor layer 156 in this embodiment is further configured to scatter the second color light L2.

In some embodiments, a peak wavelength of the third color light L3 is greater than a peak wavelength of the first color light L1 and less than the peak wavelength of the second color light L2. Further, a wavelength range of the second color light L2 and a wavelength range of the third color light L3 at least partially overlap, or the wavelength range of the second color light L2 is larger than the wavelength range of the third color light L3. More specifically, in some embodiments, the first color light L1 is substantially a blue light, the second color light L2 is substantially a red light, and the third color light L3 is substantially a yellow light. The wavelength range of the red light may be within or outside the wavelength range of the yellow light, such that the effect of supplementary light can be achieved. According to the above principle, in other variations, when the wavelength conversion particles are green phosphors, they can also be used to reflect and scatter yellow or red light. In addition, the above principles may also work when the wavelength conversion particles are in a mixed powder or multilayer composite form.

With the aforementioned structural configurations, the first light-emitting unit 110 and the second light-emitting unit 120 can generate the first color light L1, the second color light L2, and the third color light L3 through the first dichroic mirror 130, the second dichroic mirror 140, and the wavelength conversion unit 150.

In order to be better understood, the following describes the schematic paths of the first color light L1, the second color light L2, and the third color light L3 in the light source module 100, respectively.

Reference is made to FIG. 1. The first color light L1 emitted by the first light-emitting unit 110 reaches the first dichroic mirror 130 through the reflection of the second dichroic mirror 140, and the first color light L1 passes through the first dichroic mirror 130 and then arrives at the wavelength conversion unit 150. When the first color light L1 passes through the substrate 154 of the wavelength conversion unit 150, the first color light L1 passes through the wavelength conversion unit 150, and then the first color light L1 is reflected by the mirrors M, and then passes through the first dichroic mirror 130 again. Finally, the first color light L1 reaches the integration rod R at a first time sequence.

Reference is made to FIG. 1. The first color light L1 emitted by the first light-emitting unit 110 reaches the first dichroic mirror 130 through the reflection of the second dichroic mirror 140, and the first color light L1 passes through the first dichroic mirror 130 and then arrives at the wavelength conversion unit 150. When the wavelength conversion unit 150 rotates so that the phosphor layer 156 faces the first color light L1, wavelength conversion of the first color light L1 is performed, and a third color light L3 is generated. Next, the third color light L3 reaches the first dichroic mirror 130 again, and is reflected by the first dichroic mirror 130. Finally, the third color light L3 generated by the phosphor layer 156 reaches the integration rod R in a second time sequence.

Reference is made to FIG. 1. The second color light L2 emitted by the second light-emitting unit 120 passes through the second dichroic mirror 140, and passes through the first dichroic mirror 130 through the passing area 134 on the first dichroic mirror 130 and then arrives at the wavelength conversion unit 150. The phosphor layer 156 reflects and scatters the second color light L2 (i.e., the phosphor layer 156 does not perform wavelength conversion on the second color light L2). Then, the second color light L2 reaches the first dichroic mirror 130 and is reflected by the first dichroic mirror 130. Finally, the second color light L2 can also reach the integration rod R at the above-mentioned second time sequence. It should be noted that, because the second color light L2 is reflected and scattered by the phosphor layer 156, the angle and area of the emission of the second color light L2 reflected by the wavelength conversion unit 150 will become larger. Therefore, when the second color light L2 is reflected back to the first dichroic mirror 130, most of the light is reflected by the coating area 132 of the first dichroic mirror 130, while only a little portion of the light passes through the passing area 134, thereby causing a loss of the second color light L2. It is similar in terms of the third color light L3. In summary, the mode in which the first color light L1 is generated at the first time sequence and the third color light L3 and the second color light L2 are generated at the second time sequence is suitable for a single-chip projection framework with a filter color wheel at its back end.

In some embodiments, the passing area 134 is an opening, but the present disclosure is not limited thereto. In some embodiments, for example, the passing area 134 may also be an optical film or other light-transmitting plate that can transmit the second color light L2.

In some embodiments, for example, a shape of the opening as the passing area 134 in FIG. 2 may be rectangular, but the present disclosure is not limited thereto. In some embodiments, the opening may be circular, square, polygonal, or irregular. In other words, the present disclosure does not intend to limit the shape and size of the opening, which is mainly for a light beam of the second color light L2 to pass through.

Next, the light source module 400 according to one or more embodiments of the present disclosure will be described in detail below.

Figure 4:
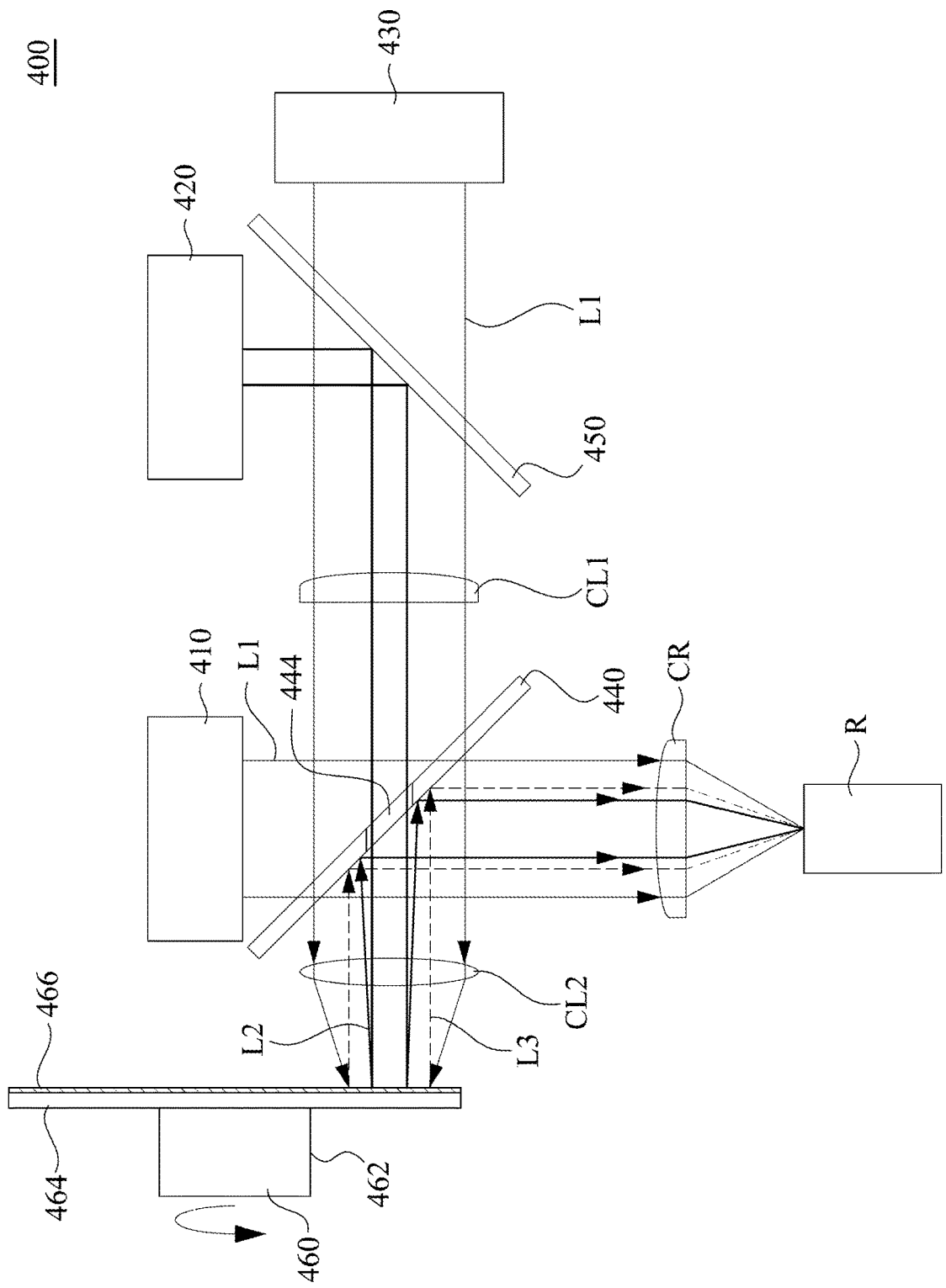
FIG. 4 shows a schematic view of a light source module in accordance with an embodiment of present disclosure.

Reference is made to FIG. 4 which shows a structural configuration of a light source module 400 according to an embodiment of the present disclosure. The light source module 400 includes a first light-emitting unit 410, a second light-emitting unit 420, a third light-emitting unit 430, a first dichroic mirror 440, a second dichroic mirror 450, a wavelength conversion unit 460, a relay lens CL1, a convex lens CL2, a relay lens CR, and the integration rod R. The first light-emitting unit 410 is configured to emit the first color light L1. The second light-emitting unit 420 is configured to emit the second color light L2. The third light-emitting unit 430 is configured to emit the first color light L1. The first dichroic mirror 440 is configured to allow the first color light L1 to transmit through and has a passing area 444. The passing area 444 is configured to allow the second color light L2 to pass through. The first dichroic mirror 440 is also configured to reflect the second color light L2 and the third color light L3 reflected by the wavelength conversion unit 460. The second dichroic mirror 450 is configured to allow the first color light L1 to transmit through, and is also configured to reflect the second color light L2. The wavelength conversion unit 460 is substantially a high-speed rotating phosphor wheel, and is configured to convert the first color light L1 transmitting through the first dichroic mirror 440 into the third color light L3, and is configured to reflect the second color light L2. The relay lens CL1 is disposed between the second light-emitting unit 420 and the first dichroic mirror 440. The relay lens CL1 is configured to transmit the second color light L2 and the first color light L1 emitted by the third light-emitting unit 430. The convex lens CL2 is configured to converge the first color light L1 and the second color light L2 emitted by the third light-emitting unit 430 and transmitting through the first dichroic mirror 440, and is configured to receive the second color light L2 and the third color light L3 reflected and scattered by the wavelength conversion unit 460. The relay lens CR is configured to converge the first color light L1, and is configured to converge the second color light L2 and the third color light L3 reflected and scattered by the wavelength conversion unit 460. The integration rod R is configured to receive the first color light L1, and is configured to receive the second color light L2 and the third color light L3 reflected and scattered by the wavelength conversion unit 460.

In some embodiments, the structure of the first dichroic mirror 440 is substantially the same as the structure of the first dichroic mirror 130. Specifically, in FIG. 4, the first dichroic mirror 440 also includes a passing area 444 and a coating area (not shown).

In some embodiments, the structure of the wavelength conversion unit 460 is similar to the structure of the wavelength conversion unit 150 in FIG. 3, except that the substrate 464 of the wavelength conversion unit 460 is a reflective substrate and does not include a transmissive substrate. Specifically, the wavelength conversion unit 460 includes a rotating shaft 462, a substrate 464, and a phosphor layer 466. The phosphor layer 466 is configured to convert the first color light L1 into the third color light L3, and is configured to reflect and scatter the second color light L2. The phosphor layer 466 is further configured to reflect and scatter the third color light L3. In some embodiments, the light source module 400 is a laser light module in a three-chip DLP system. Both the substrate 464 and the phosphor layer 466 completely surround the rotating shaft 462.

With the foregoing configurations, the first light-emitting unit 410, the second light-emitting unit 420, and the third light-emitting unit 430 can generate the first color light L1, the second color light L2, and the third color light L3 by the first dichroic mirror 440, the second dichroic mirror 450, and the wavelength conversion unit 460. The first color light L1, the second color light L2, and the third color light L3 sequentially arrive at the integration rod R at the same time, and are integrated into an equivalent white light, which is suitable for a three-chip projection framework.

In order to be better understood, the schematic paths of the first color light L1, the second color light L2, and the third color light L3 in the light source module 400 will be respectively described below.

Reference is made to FIG. 4. The first color light L1 emitted by the first light-emitting unit 410 directly passes through the first dichroic mirror 440, and the first color light L1 reaches the integration rod R through the convergence of the relay lens CR.

Reference is made to FIG. 4. The second color light L2 emitted by the second light-emitting unit 420 passes through the second dichroic mirror 450 and reaches the relay lens CL1. Then, the second color light L2 passes through the relay lens CL1 and reaches the first dichroic mirror 440, and then passes through the first dichroic mirror 440 through the passing area 444 on the first dichroic mirror 440 and reaches the convex lens CL2, and the second color light L2 passes through the convex lens CL2 and then arrives at the wavelength conversion unit 460. When the second color light L2 reaches the phosphor layer 466 of the wavelength conversion unit 460, the phosphor layer 466 will reflect and scatter the second color light L2. Then, the second color light L2 reflected and scattered by the phosphor layer 466 passes through the convex lens CL2 again and reaches the first dichroic mirror 440. Then, most of the second color light L2 are reflected by the first dichroic mirror 440 and reaches the relay lens CR. Finally, the second color light L2 reaches the integration rod R through the convergence of the relay lens CR.

Reference is made to FIG. 4, the first color light L1 emitted by the third light-emitting unit 430 passes through the second dichroic mirror 450 to reach the relay lens CL1. Then, the first color light L1 passes through the relay lens CL1 to reach the first dichroic mirror 440, and then passes through the first dichroic mirror 440 to reach the convex lens CL2. The first color light L1 reaches the wavelength conversion unit 460 through the convergence of the convex lens CL2. When the first color light L1 reaches the phosphor layer 466 of the wavelength conversion unit 460, the first color light L1 is converted into the third color light L3, and the phosphor layer 466 will also reflect and scatter the second color light L2 at the same time. Then, the third color light L3 converted by the phosphor layer 466 and the reflected and scattered second color light L2 pass through the convex lens CL2 again, and the third color light L3 and the second color light L2 reach the first dichroic mirror 440. Then, the second color light L2 and the third color light L3 are reflected by the first dichroic mirror 440 and reach the relay lens CR. Finally, the second color light L2 and the third color light L3 reach the integration rod R through the convergence of the relay lens CR.

In some embodiments, in the light source module 400, the second color light L2 emitted by the second light-emitting unit 420 is a parallel light with a small beam cross-section.

In some embodiments, in the light source module 400, the transmission or the reflection of the second color light L2 emitted by the second light-emitting unit 420 and the first color light L1 emitted by the third light-emitting unit 430 relative to the second dichroic mirror 450 can also be interchanged. That is, the first color light L1 can be reflected by the second dichroic mirror 450, while the second color light L2 can pass through the second dichroic mirror 450, and then the first color light L1 and the second color light L2 reach the relay lens CL1.

Next, a light source module 400' according to one or more embodiments of the present disclosure will be described in detail below.

Figure 5:
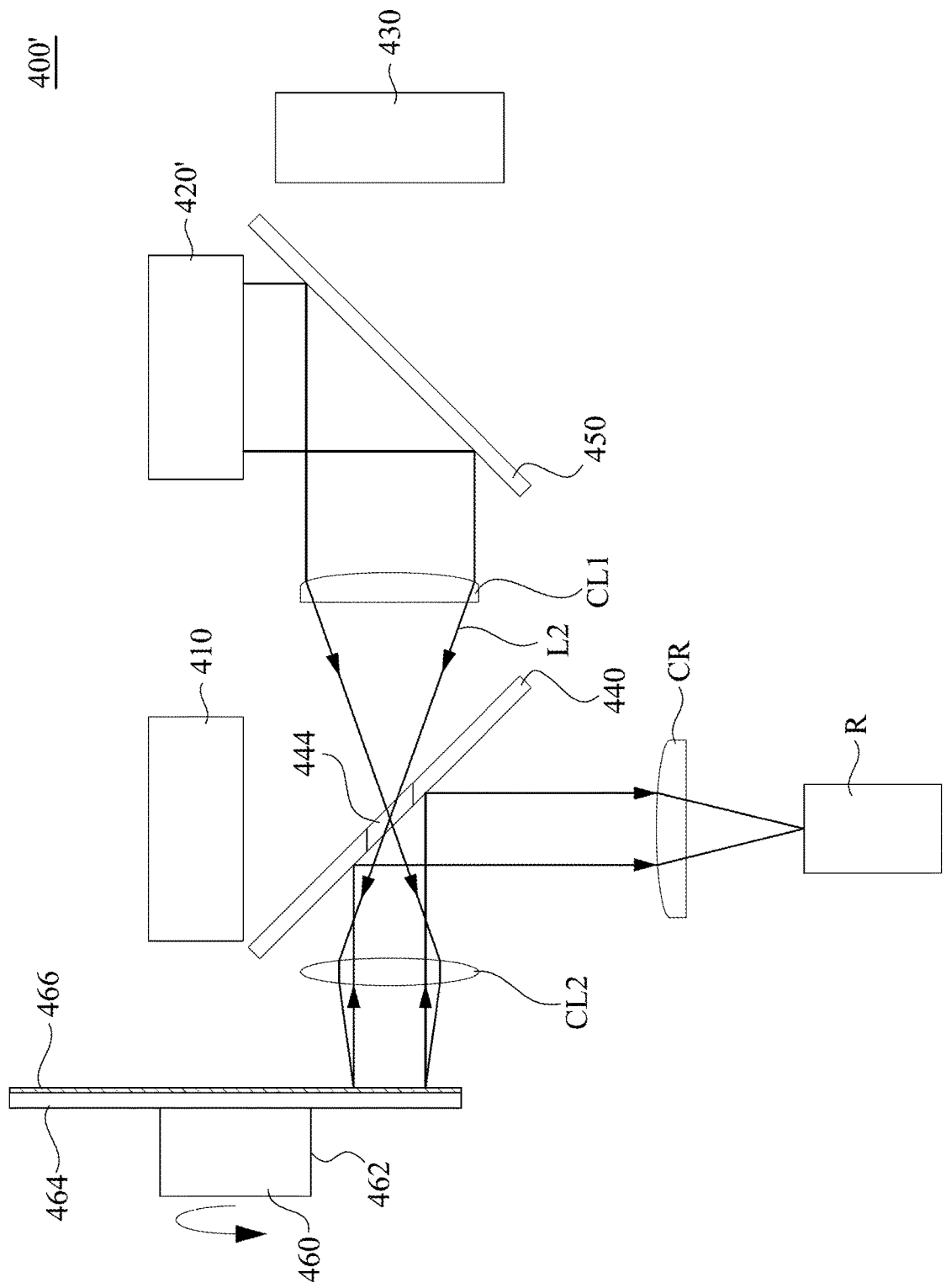
FIG. 5 shows a schematic view of a light source module in accordance with an embodiment of present disclosure.

Please refer to FIG. 5 which shows the structure of the light source module 400' according to an embodiment of the present disclosure. In fact, the structural configuration of the light source module 400' is similar to the structural configuration of the light source module 400, but the second light-emitting unit 420' of the light source module 400' is different from the second light-emitting unit 420 of the light source module 400. In the light source module 400', the second color light L2 emitted by the second light-emitting unit 420' is a parallel light with a larger beam cross-section. Specifically, a beam width of the second color light L2 emitted by the second light-emitting unit 420' is greater than a beam width of the second color light L2 emitted by the second light-emitting unit 420.

It should be noted that the schematic paths of the first color light L1 and the third color light L3 in the light source module 400' are not shown in FIG. 5, because the schematic paths of the first color light L1 and the third color light L3 in the light source module 400' are substantially the same as the schematic paths in the light source module 400. Therefore, for simplicity, FIG. 5 merely shows a schematic path of the second color light L2 in the light source module 400'.

Reference is made to FIG. 5. The second color light L2 emitted by the second light-emitting unit 420' reaches the relay lens CL1 through the second dichroic mirror 450. Then, the second color light L2 is converged by the relay lens CL1 to reach the first dichroic mirror 440, and then passes through the first dichroic mirror 440 via the passing area 444 on the first dichroic mirror 440 to reach the convex lens CL2. The second color light L2 reaches the wavelength conversion unit 460 through the convergence of the convex lens CL2. When the second color light L2 reaches the phosphor layer 466 of the wavelength conversion unit 460, the phosphor layer 466 will reflect and scatter the second color light L2. Then, the second color light L2 reflected and scattered by the phosphor layer 466 passes through the convex lens CL2 again to reach the first dichroic mirror 440. Then, the second color light L2 is reflected by the first dichroic mirror 440 and reaches the relay lens CR. Finally, the second color light L2 reaches the integration rod R through the convergence of the relay lens CR.

From the above detailed description of the specific embodiments of the present disclosure, it can be clearly seen that in the light source module of the present disclosure, by arranging the passing area on the first dichroic mirror, the color light used as a supplementary light can pass through the first dichroic mirror via the passing area. The color light passing through the passing area is then reflected and scattered by the phosphor layer of the wavelength conversion unit, and is collected by the integration rod. It can be seen that there is no excessive loss of the process of the color light from being emitted to reaching the integration rod, so as to achieve the best light supplement effect.

The above summarizes the characteristics of several embodiments, so that those skilled in the art can better understand the implementation of the present disclosure. Those skilled in the art should understand that without departing from the spirit and scope of the case, the above can be easily used as a basis for design or modification for other changes in order to implement the same purpose and/or realize the same advantage as the embodiments described herein. The above should be understood as an example of this disclosure, and the scope of patent protection should be subject to the scope of the claims.

What is claimed is:

1. A light source module comprising:
   a first light-emitting unit configured to emit a first color light;
   a second light-emitting unit configured to emit a second color light, wherein the first color light and the second color light have different wavelength ranges respectively;
   a first dichroic mirror configured to allow the first color light to transmit through and having a passing area, wherein the passing area is configured to allow the second color light to pass through; and
   a wavelength conversion unit comprising a substrate and a phosphor layer disposed on the substrate and a transmissive portion, wherein the phosphor layer is configured to convert a portion of the first color light transmitting through the first dichroic mirror into a third color light, and is configured to reflect and scatter the second color light passing through the passing area, and the transmissive portion is configured to transmit another portion of the first color light transmitting through the first dichroic mirror,
   wherein the first dichroic mirror is configured to reflect the second color light reflected by the wavelength conversion unit and the third color light and transmit the first color light such that the first color, second color and third color lights are colinearly directed away from the first dichroic mirror.

2. The light source module of claim 1, further comprising a second dichroic mirror, the second dichroic mirror being configured to reflect the second color light and allow the first color light to pass through, and enable the first color light and the second color light to reach a relay lens.

3. The light source module of claim 2, wherein the relay lens is disposed between the second light-emitting unit and the first dichroic mirror, and is configured to transmit the first color light and the second color light to reach the first dichroic mirror.

4. The light source module of claim 3, wherein the relay lens is further configured to transmit the second color light to pass through the passing area.

5. The light source module of claim 1, further comprising a second dichroic mirror, the second dichroic mirror being configured to reflect the first color light and allow the second color light to pass through, and enable the first color light and the second color light to reach a relay lens.

6. The light source module of claim 5, wherein the relay lens is disposed between the second light-emitting unit and the first dichroic mirror, and is configured to transmit the first color light and the second color light to reach the first dichroic mirror.

7. The light source module of claim 6, wherein the relay lens is further configured to transmit the second color light to pass through the passing area.

8. The light source module of claim 1, wherein a peak wavelength of the third color light is greater than a peak wavelength of the first color light and is less than a peak wavelength of the second color light.

9. The light source module of claim 8, wherein the wavelength range of the second color light and a wavelength range of the third color light at least partially overlap.

10. The light source module of claim 8, wherein the wavelength range of the second color light is larger than a wavelength range of the third color light.

11. The light source module of claim 1, wherein the passing area is an opening.

12. The light source module of claim 1, wherein the phosphor layer is further configured to reflect and scatter the second color light.

13. The light source module of claim 1, wherein the substrate is a reflective substrate.

14. The light source module of claim 1, wherein the transmissive portion is a transmissive material or a hollowed portion.

15. The light source module of claim 1, wherein the first color light is a blue light, and the second color light is a red light.

16. The light source module of claim 1, wherein the third color light is substantially a yellow light.

* * * * *